United States Patent [19]

Feldstein

[11] 4,358,922

[45] Nov. 16, 1982

[54] METALLIC ARTICLES HAVING DUAL LAYERS OF ELECTROLESS METAL COATINGS INCORPORATING PARTICULATE MATTER

[75] Inventor: Nathan Feldstein, Princeton, N.J.

[73] Assignee: Surface Technology, Inc., Princeton, N.J.

[21] Appl. No.: 139,108

[22] Filed: Apr. 10, 1980

[51] Int. Cl.$^3$ .................. D01H 1/24; D02G 3/00; B05D 1/18; B37B 3/00

[52] U.S. Cl. .................. 57/401; 57/337; 57/414; 148/31.5; 427/383.1; 427/383.7; 427/367; 427/368; 427/404; 427/405; 427/419.2; 427/419.7; 427/438; 427/443.1; 428/634; 428/636; 428/652; 428/679; 428/687; 428/936

[58] Field of Search .............. 428/614, 634, 636, 680, 428/679, 652, 687, 936; 148/31.5; 427/214, 217, 404–406, 374.1, 368, 419.2, 419.7, 443.1, 438, 383.1, 383.7, 367; 57/58, 89, 337

[56] References Cited

U.S. PATENT DOCUMENTS

| | | | |
|---|---|---|---|
| 3,401,019 | 9/1968 | Gowan et al. | 428/446 |
| 3,449,223 | 6/1969 | Odekerken | 428/680 |
| 3,753,667 | 8/1973 | Metzger et al. | 428/936 |
| 3,787,229 | 1/1974 | Rudness | 428/687 |
| 3,936,577 | 2/1976 | Christini et al. | 428/936 |
| 4,193,253 | 3/1980 | Herbert et al. | 57/58.89 |
| 4,195,470 | 4/1980 | Sturhahn | 57/337 |

OTHER PUBLICATIONS

"What You Should Know About NYE-CARB", Electrocoatings Inc., Moraga, Calif., pp. 1–4, (1975).

R. Barras et al., "Electroless Nickel Coatings-Diamond Containing", Electroless Nickel Conference, Nov. 1979.

*Primary Examiner*—Michael L. Lewis

[57] ABSTRACT

Disclosed are processes and articles for composite electroless coatings comprising at least two distinct layers, the first layer comprising a metal and/or a metal alloy plus particulate matter and the second layer comprising a metal and/or a metal alloy and being substantially free of particulate matter.

39 Claims, No Drawings

METALLIC ARTICLES HAVING DUAL LAYERS OF ELECTROLESS METAL COATINGS INCORPORATING PARTICULATE MATTER

BACKGROUND OF THE INVENTION

Composite electroless coating is a new generation of composites which can be derived via electroless plating techniques. The following patents and article reflect upon the state of the art, the techniques which are used, as well as those particulate matters which may be incorporated within the electroless plating matrices: U.S. Pat. Nos. 3,617,363; 3,674,447; 3,753,667; U.S. Pat. No. 29,285; R. Barras et al., "Electroless Nickel Coatings-Diamond Containing", Electroless Nickel Conference, Cincinnati, Ohio, November, 1979; and British Pat. No. 1,476,024. These Patents are included herein by reference.

Though electroless plating may be applied to a wide variety of substrates, the coating of metallic substrates is of great technological interest for achieving any of several properties on the initial substrates (e.g., corrosion protection, wear-resistance, etc.). However, plating may be carried forth on non-conductor and semiconductor type substrates as well. Though the mechanism of composite electroless plating is not fully understood, it is believed that the insoluble particulate matter suspended within the electroless plating composition are entrapped during the electroless plating process build-up. For an effective entrapment, the insoluble particle must attach itself to the surface and permit the conventional electroless plating process to proceed without disturbance, and encapsulate the particle(s) without disruption of the plating process.

It is therefore recognized, since the particulate matter does not appear to participate in the actual (basic) mechanism (see (1) R. M. Lukes, Plating, 51, 969 (1964); (2) N. Feldstein et al., J. Electrochem. Soc. 118, 869 (1971); (3) G. Salvago et al., Plating, 59, 665 (1972)) of the conventional electroless plating but rather is entrapped, that it is therefore essential that there be a high probability for the particulate matter to "stick" to the surface and result in fruitful entrapment rather than contacting the surface and falling off the surface into the bulk solution. It is also recognized that the electroless nickel matrix provides "cement" for the entrapment of the particulate matter. Moreover, it is undesirable for the particles to become autocatalytic.

In general, in the present invention, particles in the size range of 0.5 to 75 microns may be contemplated. It is further preferable to select the desired particle size with a narrow particle size distribution. In most applications, generally speaking, the particle size is in the range of 15 to 30% by volume, though is is possible, particularly with higher temperature and/or high bath load concentration, to achieve particle loading within the deposit exceeding 40% by volume.

In the case of diamond particulate matter, especially diamond of a polycrystalline nature manufactured by an explosion process, preferred particles may be selected in the range of 1 to 9 microns in size.

Table 1 provides the hardness of selected materials. The materials demonstrated in Table 1 are diamond, silicon carbide, corundum, tungsten carbide, nitrided steel, hard chrome, etc. It is therefore realized that for wear-resistant application it would be most useful to incorporate particulate matter having a greater hardness value in comparison to the metallic matrix derived via electroless plating or those materials or particles which are higher than the nickel phosphorus alloy which reaches a hardness of approximately 69 Rockwell C units with heat treatment, as is well known in the art.

TABLE 1

| Hardness of Selected Materials | |
|---|---|
| Material | Hardness (Vickers-Kg/mm$^2$) |
| Diamond | 10,000 |
| Silicon Carbide | 4,500 |
| Corundum (Al$_2$O$_3$) | 2,400 |
| Tungsten Carbide | 1,300 |
| Nitrided Steel | 1,110 |
| Hard Chrome Plate | 1,000 (R$_c$ 70) |
| Nickel Phosphorous Alloy | 950 (R$_c$ 69) |
| Hardened Steel | 900 (R$_c$ 62) |
| P-2 Steel | 400 (R$_c$ 38) |

SUMMARY OF THE INVENTION

A process and articles for electroless plating incorporating particulate matter are described. The process and article(s) thereof comprise at least two distinct metallic layers, the first of which comprises the particulate matter and thereafter a metallic layer substantially free of particulate matter.

DETAILED DESCRIPTION OF THE INVENTION

Articles which are of special concern where the present invention is particularly useful are those articles having a cylindrical or a disc-type geometry.

The articles (e.g., textile machinery parts) which will be used or affected by this process are of those general types known in the textile industry as friction texturing discs, spinning rolls (open end and others) and rotors. Generally, these parts have circular, bell shaped, cylindrical or multicylindrical geometries. They are primarily used in a spinning or rotary fashion with the directional movement of the part about an axis which is perpendicular to the plane of rotation.

Specifically, friction texturing discs used to impart a false twist have a multicylindrical geometry (Textured Yarn Technology/Volume 2, Stretch Yarn Machines, Monsanto Co. 1967, Edited by G. D. Wilkinson ATI, p. 16) with the outside circumference, or that which actively contacts the yarn, slightly rounded or convex. Contact of the yarn is made partly perpendicular to the part's circumference, and parallel to the axis of rotation.

Spinning rolls are of a cylindrical geometry in which yarn contacts the outside circumference in a parallel or unidirectional fashion, or perpendicular to the axis of rotation. The outside or active circumference of this part usually contains pins or teeth which actually perform the necessary functions.

Rotors (see U.S. Pat. No. 3,439,487) are bell shaped articles in which the yarn contacts the bell or open end of the piece in a direction which is parallel to the axis of rotation.

Many of these materials are of aluminum, aluminum alloy, or plastics due to their light weight, cost, and relative ease of shaping. Other metallic substrates which may be used with the present invention, aside from aluminum alloys, may be carbon steel alloy and tooled steel, 400 series stainless steel, high speed steel, 300 series stainless steel, brass, copper and its alloys, nickel and its alloys, and combinations thereof.

For achieving the maximum hardness (e.g., 69 $R_c$) for typical nickel phosphorus coating, heat treatment at a temperature of about 750° F. should be carried forth. This heat treatment step, aside from providing improved adhesion of the metallic layers to the substrate, provides the well known matrix hardening for nickel phosphorous or nickel boron type alloys.

In the metallization of textile machinery parts, the final roughness of the coating is an important parameter in order to insure no damage to the contacted yarn. At the same time, the inclusion of the particulate matter to the wear-resistant coating leads to increased surface roughness. The resulting surface roughness is proportional to various parameters such as particle size, concentration of particles in the coating, the thickness plated, as well as the initial roughness of the substrate.

In order to meet the "smoothness" requirement for textile applications, particularly in texturing operations, smoothing of the final coating bearing the metallic matrix and particles has been an accepted procedure. In so doing, e.g., by brushing, loosening and knocking off of outer particles has taken place. This procedure is time consuming and costly since the wear resistant particles are extremely hard (e.g., diamond). It is thus highly desirable to provide with coated articles with which the brushing time would be reduced and the resulting product be useful in wear resistant application.

In demonstrating the present invention, aluminum friction texturing discs were utilized. The discs were cleaned, zincated for activation, and thereafter were plated in a commercial electroless plating bath (Enplate 415, product of Enthone, Inc.) to which 7 g/l of 6 micron polycrystalline diamonds (explosion type product) were included. The bath was operated at 82° C. and plating to about 19 microns in thickness was undertaken. Thereafter, several discs were plated in an electroless plating bath which was substantially devoid of particulate matter. In the actual experiment, the electroless bath was Niculoy 22 (sold by the Shipley Company) without any particulate matter. Parts were plated under the conditions recommended by the vendor, from zero to 2 hours of plating time. To insure good adhesion, a heat treatment step to yield a matrix hardness of about 69 $R_c$ was undertaken. It is noted that heat treatment does not change the surface roughness of the coating. Table 2 provides the resulting roughness with varied brushing time. It is noted that though some of the coated parts have a higher surface roughness (as-plated) in comparison to the control, their surface roughness decreased more rapidly when subjected to equal brushing time(s).

TABLE 2

Roughness vs. Brushing Time

| Brushing time: | As plated | Roughness[a]: Average of five discs | | | | | |
|---|---|---|---|---|---|---|---|
| | | 15 sec | 30 sec | 60 sec | 120 sec | 240 sec | 480 sec |
| Test 1 (control) | 60.6 | 55.2 | 51.3 | 48.5 | 42.5 | 37.8 | 36.3 |
| Test 2[b] | 69.4 | 39.3 | 36.9 | 30.4 | 24.4 | 19.2 | 16.2 |
| Test 3[b] | 74.0 | 43.4 | 35.6 | 30.4 | 25.4 | 19.4 | 15.2 |
| Test 4[b] | 80.6 | 41.9 | 37.5 | 32.1 | 26.2 | 20.4 | 17.0 |

[a]Roughness data are as measured utilizing a Gould Surf-Indicator. Dividing the average roughness value by 1.54 provides roughness values in AA units. Disks prepared with a plating time of 1.0 hours and brushing time of 30 seconds inherently are substantially covered by an amount of electroless metal from the second plating bath.
[b]Tests 2, 3, and 4 represent the supplemental layers plated for periods of 1.0, 1.75, and 2 hours respectively. Test 1 (control) is without a supplemental electroless layer.

Though there are many electroless plating formulations which may be deposited as the final layer, bright type deposits are preferred (see "Modern Electroplating", Third Edition, R. Lowenheim, editor, Chapter 31, and references therein which are included herein by reference).

It is thus recognized that the articles produced by the present invention comprise at least two layers, specifically, a first layer which is a composite containing the particulate matter and a second layer which is substantially devoid of particulate matter. In general, it is preferable that the second layer comprise the same composition as the composite layer, however, in the absence of particulate matter. Moreover, due to the regenerative type nature of the coatings in this invention, any wear of the outer layer will still yield useful articles capable of withstanding wear during usage.

Though in the above illustration diamond has been used, it would be obvious to substitute other particulate matter for both wear resistance and/or lubrication purposes. Such substitution falls within the spirit of this invention.

What I claim is:

1. A metallized article produced by the steps comprising:
    (1) contacting said article with an electroless plating bath further comprising insoluble suspended particulate matter to provide a composite layer comprising a member selected from the group consisting of a metal, a metal alloy, and mixtures thereof, and the insoluble particulate matter,
    (2) contacting said treated article with an electroless plating bath to provide a layer comprising a member selected from the group consisting of a metal, a metal alloy, and mixtures thereof, said layer being substantially free of particulate matter substantially covering the particulate matter exposed from step 1, and subsequently
    (3) removing a portion of the electrolessly deposited layer deposited in step 2 thereby providing a smoother surface finish in comparison to the surface finish after step 1, however retaining a sufficient amount of electroless metal from step 2 to substantially cover the particulate matter exposed from step 1.

2. The article according to claim 1 wherein said electroless plating bath used in step 1 is nickel phosphorous.

3. The article according to claim 1 wherein said particulate matter is wear-resistant particles having particle size in the range of 0.5 to 70 microns.

4. The article according to claim 1 wherein said particulate matter is diamonds.

5. The article according to claim 1 wherein said particles are polycrystalline diamond.

6. The article according to claim 1 wherein said metallic article is a friction texturing disc.

7. The article according to claim 1 wherein said metallic article is aluminum or aluminum alloy.

8. The article according to claim 1 produced by the further step of heat treatment.

9. The article according to claim 1 wherein said particulate matter is polycrystalline diamond and wherein said diamond with said composite coated layer constitutes in a range of 20 to 30 volume percent.

10. The article according to claim 1 wherein said article is steel.

11. The article according to claim 1 wherein said metallic article is a rotor.

12. The article according to claim 1 wherein said article is a roll used in open end spinning.

13. The article according to claim 1 produced by the further step of heat treatment thereby resulting in the electroless nickel matrix having a hardness of approximately 70 Rockwell units.

14. The article according to claim 1 wherein said particulate matter is wear-resistant particles having a hardness greater than said matrix.

15. The article according to claim 1 wherein said particulate matter is polycrystalline wear-resistant particles.

16. The article according to claim 1 wherein said particulate matter is 6 micron particle size.

17. The article according to claim 1 wherein said electroless plating bath used in step 1 provides with a coating comprising of approximately 88 to 93 percent nickel and approximately 7 to 11 percent phosphorous in the coating devoid of the particulate matter.

18. A process for the metallization of a substrate comprising the steps:
  (1) contacting said substrate with an electroless plating bath further comprising insoluble suspended particulate matter to provide a composite layer comprising a member selected from the group consisting of a metal, a metal alloy, and mixtures thereof, and the insoluble particulate matter,
  (2) contacting the treated substrate with an electroless plating bath to provide a layer comprising a member selected from the group consisting of a metal, a metal alloy, and mixtures thereof, said layer being substantially free of particulate matter substantially covering the particulate matter exposed from step 1, and subsequently
  (3) removing a portion of the electrolessly deposited layer deposited in step 2 thereby providing a smoother surface finish in comparison to the surface finish after step 1, however retaining a sufficient amount of electroless metal from step 2 to substantially cover the particulate matter exposed from step 1.

19. The process according to claim 18 wherein said substrate is aluminum.

20. The process according to claim 18 wherein said substrate is an alloy of aluminum.

21. The process according to claim 18 wherein said electroless plating bath used in step 1 is nickel phosphorous.

22. The process according to claim 18 wherein said electroless plating bath used in step 2 is nickel phosphorous.

23. The process according to claim 18 wherein said particulate matter is a wear-resistant particle.

24. The process according to claim 18 wherein said particulate matter is diamond.

25. The process to claim 18 wherein said particulate matter is diamond of a polycrystalline type.

26. The process according to claim 18 wherein said substrate is a friction texturing disc as used in texile machinery.

27. The process according to claim 18 wherein said substrate is aluminum or aluminum alloy and wherein said part is a rotor as used in textile machinery.

28. The process according to claim 18 wherein said substrate after metallization is further smoothed to a surface roughness in the range of 10 to 20 AA units.

29. The metallized article according to claim 1 further produced by a surface smoothing which results in a surface roughness in the range of 10 to 20 AA units.

30. The process according to claim 18 wherein the metallized substrate is further smoothed.

31. The process according to claim 30 wherein said metallized substrate is a textile machinery part.

32. The process according to claim 31 wherein said textile machinery part is selected from the group consisting of discs, rotors, and rolls.

33. The process according to claim 30 wherein said substrate is aluminum or aluminum alloy.

34. The process according to claim 30 wherein said substrate is steel.

35. The process according to claim 30 wherein said metallized substrate is comprised of nickel and phosphorous.

36. The process according to claim 30 wherein said metallized substrate consists of a metallic matrix having a hardness of approximately 70 Rockwell units.

37. The process according to claim 30 wherein said metallized substrate comprises particulate matter selected from the group consisting of diamond, silicon carbide, and aluminum oxide.

38. The metallized article according to claim 1 having an increased surface roughness after step 2 in comparison to the surface roughness at the conclusion of step 1.

39. The process according to claim 18 whereby the metal deposition of step 2 increases the surface roughness in comparison to the surface roughness at the conclusion of step 1.

* * * * *